(12) United States Patent
Renfro et al.

(10) Patent No.: US 10,053,158 B1
(45) Date of Patent: Aug. 21, 2018

(54) MOUNT FOR CANOPIES TO GO ON GENERIC ROLLOVER BARS FOR RIDING LAWN MOWERS AND TRACTORS

(71) Applicant: Accu-Form Polymers, Inc., Warsaw, NC (US)

(72) Inventors: Patrick Renfro, Warsaw, NC (US); John R. Renfro, Wendell, NC (US)

(73) Assignee: Accu-Form Polymers, Inc., Warsaw, NC (US)

( * ) Notice: Subject to any disclaimer, the term of this patent is extended or adjusted under 35 U.S.C. 154(b) by 0 days.

(21) Appl. No.: 15/619,724

(22) Filed: Jun. 12, 2017

Related U.S. Application Data (60) Provisional application No. 62/370,366, filed on Aug. 3, 2016.

(51) Int. Cl.
*B62D 33/06* (2006.01)
*B60R 21/13* (2006.01)
*B60J 7/16* (2006.01)

(52) U.S. Cl.
CPC ......... *B62D 33/0621* (2013.01); *B60J 7/1635* (2013.01); *B60R 21/131* (2013.01)

(58) Field of Classification Search
CPC ............ B62D 33/0625; B62D 33/0621; B62D 33/0617; B60R 21/131; B60J 7/1635; B60J 7/1678; B60J 7/1657

USPC ......................................................... 296/102
See application file for complete search history.

(56) References Cited

U.S. PATENT DOCUMENTS

| | | | |
|---|---|---|---|
| 5,882,063 A | * | 3/1999 | Job ................. B62D 233/0625 |
| 7,152,903 B2 | | 12/2006 | Westendorf et al. ......... 296/102 |
| 7,182,399 B2 | | 2/2007 | Kamerer .................. 296/193.12 |
| 7,641,234 B1 | * | 1/2010 | Pelnar ...................... B60R 21/13 |
| 2005/0073169 A1 | * | 4/2005 | Kamerer ............ B62D 33/0625 |
| 2005/0168007 A1 | * | 8/2005 | Westendorf et al. ................... B62D 33/0621 |
| 2015/0076855 A1 | * | 3/2015 | Vogt ....................... B60J 7/1678 |
| 2016/0214653 A1 | * | 7/2016 | Cook .................... B62D 27/065 |
| 2017/0267081 A1 | * | 9/2017 | Cook ..................... B60J 7/1657 |

* cited by examiner

*Primary Examiner* — Jason S Morrow
(74) *Attorney, Agent, or Firm* — MacCord Mason PLLC (57) ABSTRACT

A universal mount for installing a canopy onto tractor and mower ROPS (roll bars). The ROPS may have left and right downward extensions and a bridging element between the left and right downward extensions. The universal mount includes a clamp to secure the universal mount onto a ROPS, a crossbar attached to the clamp extending parallel to the bridging element, and plates on each opposed end of the crossbar. Each plate has at least one slot adapted to receive a fastener. The universal mount can be clamped to a ROPS with the canopy fastened by aligning holes on the canopy with the slots and passing fasteners through. The canopy attitude can be adjusted to a desired orientation by positioning fasteners at a selected position in the slots.

13 Claims, 7 Drawing Sheets

MOUNT FOR CANOPIES TO GO ON GENERIC ROLLOVER BARS FOR RIDING LAWN MOWERS AND TRACTORS

BACKGROUND OF THE INVENTION

The present invention relates to a universal canopy and mount for tractor and mower roll bars. Tractors and other work vehicles often include a roll over protection system (ROPS) for protecting drivers in case the vehicle turns over. Typically, the ROPS comprises roll bars attached to the vehicle that prevents a person in the vehicle from being crushed by the vehicle if it overturns. Many variations of ROPS exist, and may depend on the vehicle and manufacturer. For example, ROPS may be a fixed structure or may be foldable for storage purposes and operating in low clearance areas. Some vehicles may have an integrated ROPS, while others (particularly older vehicles) may require installation of roll bars that are sold separately. ROPS may also vary in the number of roll bars and the angle of the roll bars with respect to the vehicle.

The structure of ROPS provides a suitable location for installing canopies. However, because of the various ROPS available, the connection between the ROPS and the canopies are highly dependent on the particular model of the ROPS. Installing a canopy intended for one ROPS model on another model type may lead to a less than desirable configuration, such as a slanted canopy. Thus, there remains a need for a universal mount for installing canopies independent of the tractor and mower ROPS that enables the user to adjust the canopy's angle accordingly.

SUMMARY OF THE INVENTION

The present invention fulfills one or more of these needs in the art by providing a universal canopy for tractor and mower roll bars. In one embodiment, a universal canopy is provided for tractor and mower ROPS (roll bars) that have left and right downward extensions and a bridging element between the left and right downward extensions. The universal canopy includes a ROPS mount with a clamp to clamp to a ROPS. A crossbar attached to the clamp extends laterally across the ROPS toward the left and right downward ROPS extensions. Plates on each of the opposed ends of the crossbar have two opposed arcuate cutouts. A canopy with a supportive structure on its perimeter has a plurality of holes arrayed in a fore-and-aft orientation on its right and left side. The ROPS mount can be clamped to the top surface of the ROPS and the canopy can be bolted to the ROPS mount by passing knob-capped bolts through selected ones of the holes in the canopy perimeter support structure and one of the arcuate cutouts, and the canopy attitude can be adjusted to a desired orientation by tightening knob capped bolts at a selected position in the arcuate cutouts. The holes may be located on either an exterior or interior face of the canopy.

The canopy may be formed of thermoformed plastic. For example, the canopy may be thermoformed from acrylonitrile butadiene styrene. The canopy may also further include an acrylic layer coating, such as an acrylic film (e.g., Korad™ film) or a co-extruded acrylic surface. The canopy may also be rotationally molded or thermoformed from polyethylene.

In another embodiment, a universal mount is provided for installing a canopy onto tractor and mower ROPS (roll bars) that have left and right downward extensions and a bridging element between the left and right downward extensions. The universal mount includes a clamp to secure the universal mount onto a ROPS, a crossbar attached to the clamp that extends generally parallel to the bridging element when installed, and plates on each opposed end of the crossbar. Each plate has at least one slot adapted to receive a fastener. The universal mount can be clamped to a ROPS and the canopy can be fastened to the universal mount by aligning holes on the canopy with the slots and passing fasteners through the slots and into the canopy. The mounting plate with slots may be either on the outside of the canopy or in another embodiment inside the canopy. The clamp may attach to the bridging element of the ROPS. During or after installation, the canopy attitude can be adjusted to a desired orientation by positioning fasteners at a selected position in the slots.

The number of slots on each plate may vary. For example, each plate may have two opposing slots. In one embodiment, the slots may be curved. In another embodiment, the slots may be straight.

The invention can also be considered as a method for installing a canopy onto tractor and mower ROPS that have left and right downward extensions and a bridging element between the left and right downward extensions by clamping a mount having a crossbar with plates toward opposing ends to the bridging element, aligning holes along the periphery of the canopy with a slot along each plate, passing bolts through the holes and slots, adjusting the angle of the canopy by positioning the bolts along the slots, and securing the canopy at the angle by fastening the bolts onto the plates into the canopy.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
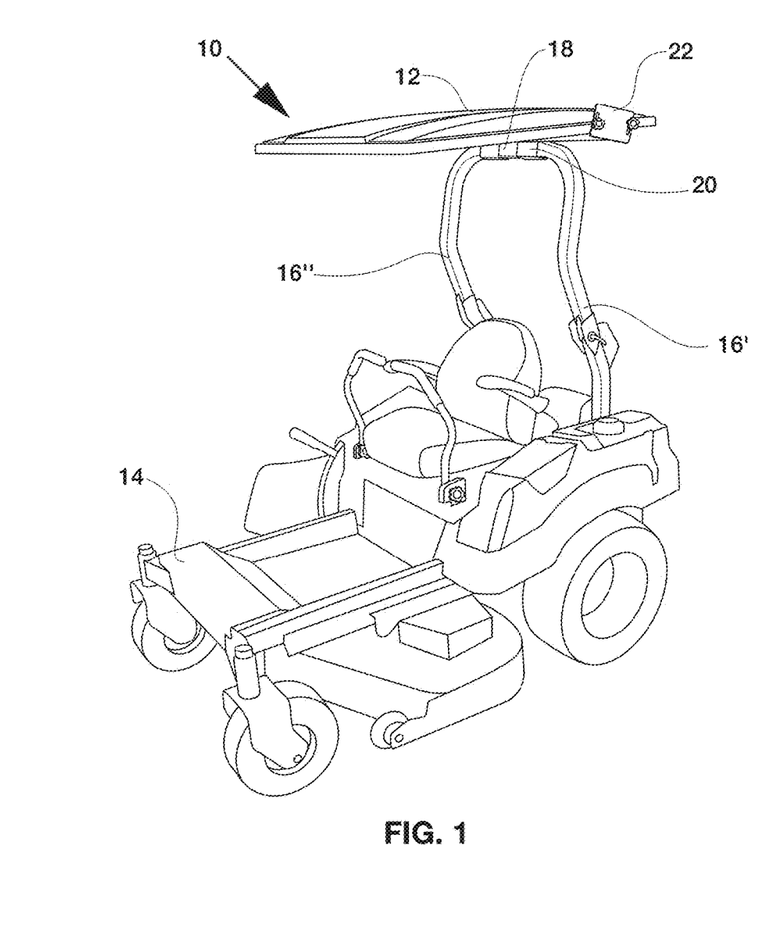
FIG. 1 is a perspective view of a mower having a universal canopy installed according to one embodiment.

FIG. 1 shows one embodiment of a universal mounting system, generally designated 10, attaching a canopy 12 onto a mower 14. Mower 14 includes a roll over protection system (ROPS) comprising a left downward extension 16' and a right downward extension 16" with a bridging element 18 in between. In the embodiment shown, universal mounting system 10 includes a clamp 20 for attaching to bridging element 18 and a plate 22 for installing canopy 12.

Figure 2:
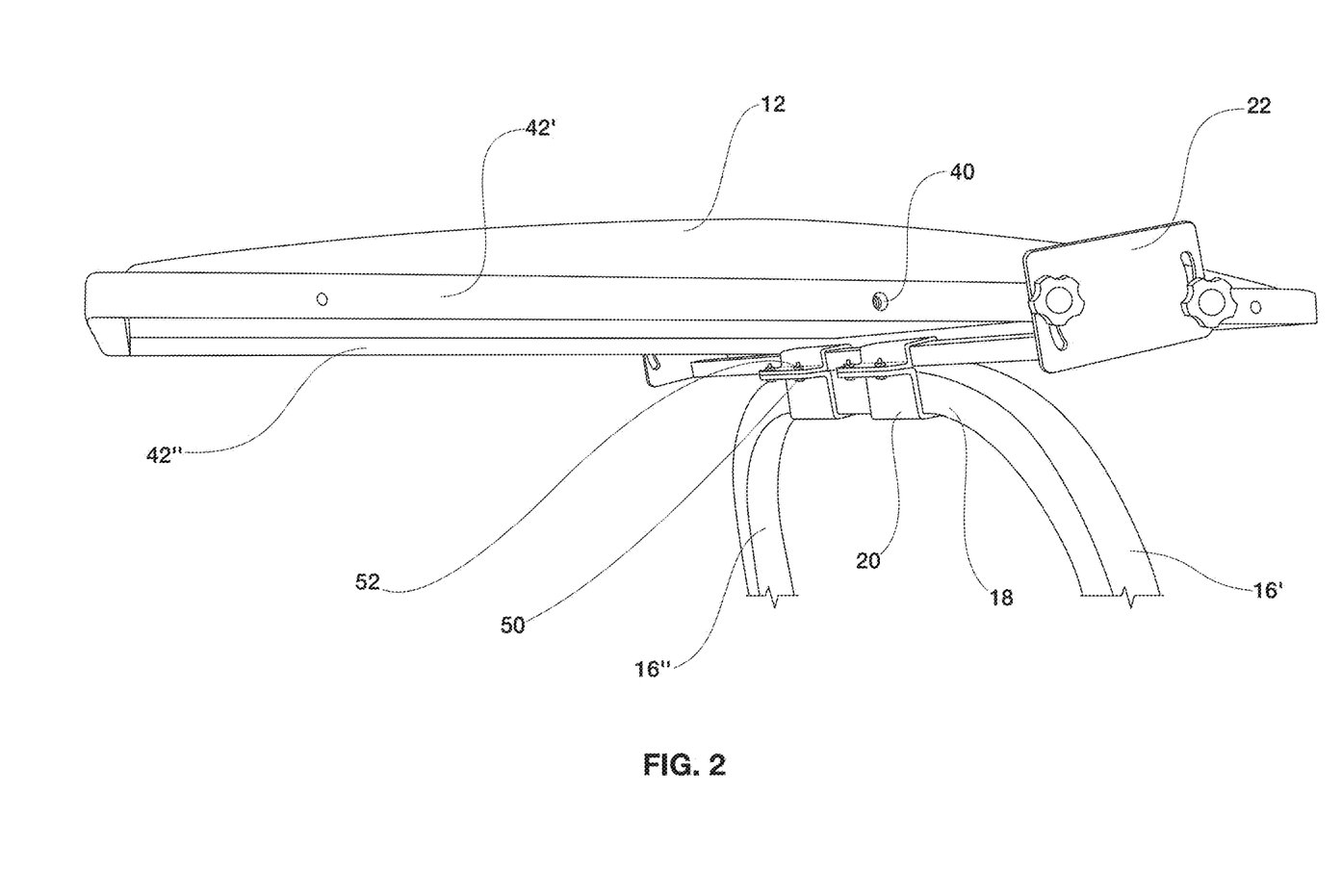
FIG. 2 is an enlarged side perspective view of a universal canopy.

FIG. 2 shows a canopy 12 installed onto bridging element 18 via mounting system 10. Canopy 12 is thermoformed of a plastic that is preferably acrylonitrile butadiene styrene (ABS) plastic coated with an acrylic layer for weatherability.

See www.accuform-polymers.com/thermoforming.html. ABS is a common thermoplastic polymer known for its lightness, stiffness, impact resistance and toughness. In one embodiment, the acrylic layer may be Korad™ film, available from PolyOne™ (Avon Lake, Ohio) at www.polyone.com/products/films/korad-weatherable-acrylic-films. Other acrylic films may be used. In alternative embodiments, canopy 12 may comprise a co-extruded acrylic surface.

Figure 3:
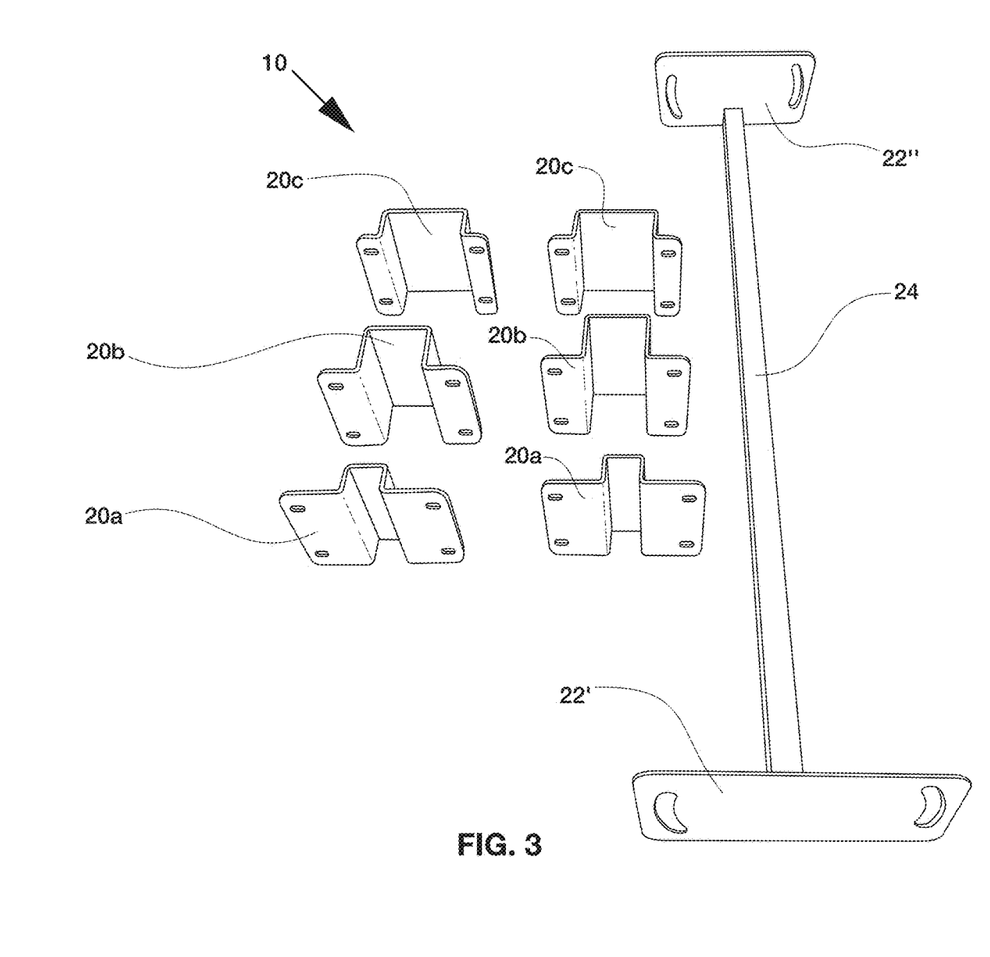
FIG. 3 is a disassembled view of a universal mounting system with varying sizes of clamps.

As seen in FIG. 3, one embodiment of mounting system 10 comprises a crossbar 24 with plates 22' and 22" on opposing ends. Different ROPS models have bridging elements that vary in size (varying both in length and cross-sectional shape and area). To accommodate various bridging element sizes, mounting system 10 may comprise a kit including a plurality of ROPS clamp elements 20b and 20c having varying fixed sizes that are adapted to fit under bridging elements 18 of specific size. As shown in FIG. 3, ROPS clamps elements 20b and 20c each vary in width for mounting onto a desired ROPS model. Crossbar clamp element 20a couples crossbar 24 with bridging element 18 by mating with the selected clamp element 20b or 20c. In some embodiments, clamp 20 may be adjustable as instead of having a fixed size. The shape of the clamp 20 may also vary in other embodiments. For instance, clamp 20 may comprise a semi-circle to fit a ROPS that is made of tubular material having a rounded-cross section instead of a squared one. Friction tape may be added to the inside of the rounded part of the clamp to aid in the claiming on the round cross section ROPS.

Figure 4:
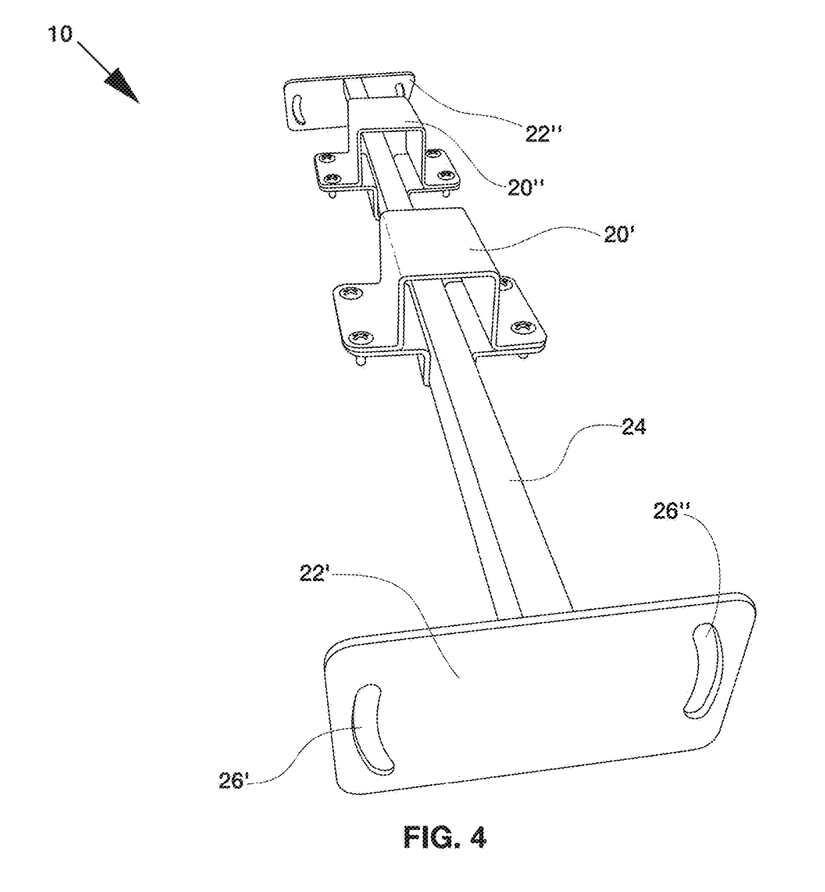
FIG. 4 is an enlarged perspective view of a partially assembled universal mounting system adapted for installing a canopy onto a work vehicle.

One or more clamps 20 may be used to attach crossbar 24 onto bridging element 18. FIG. 4 shows one example where clamps 20' and 20" mounted across crossbar 24 and are adapted to be mounted onto bridging element 18. Preferably, the crossbar 24 and crossbar clamp element 20a have complementary cross sections (square in the embodiments shown) that prevent rotation of the crossbar within the channel part of the clamp element 20a. Similarly, since square cross section ROPS are common, the cross section of the channels of ROPS clamp elements 20b and 20c are complementary squares. Other shapes can be used.

Each of the clamp elements 20a, 20b, 20c have outward-extending flanges so that a clamp element 20a can be joined to a clamp element 20b or 20c by passing bolts 50 through aligned holes in the flanges and securing with nuts 52 (see FIG. 2).

Figure 5:
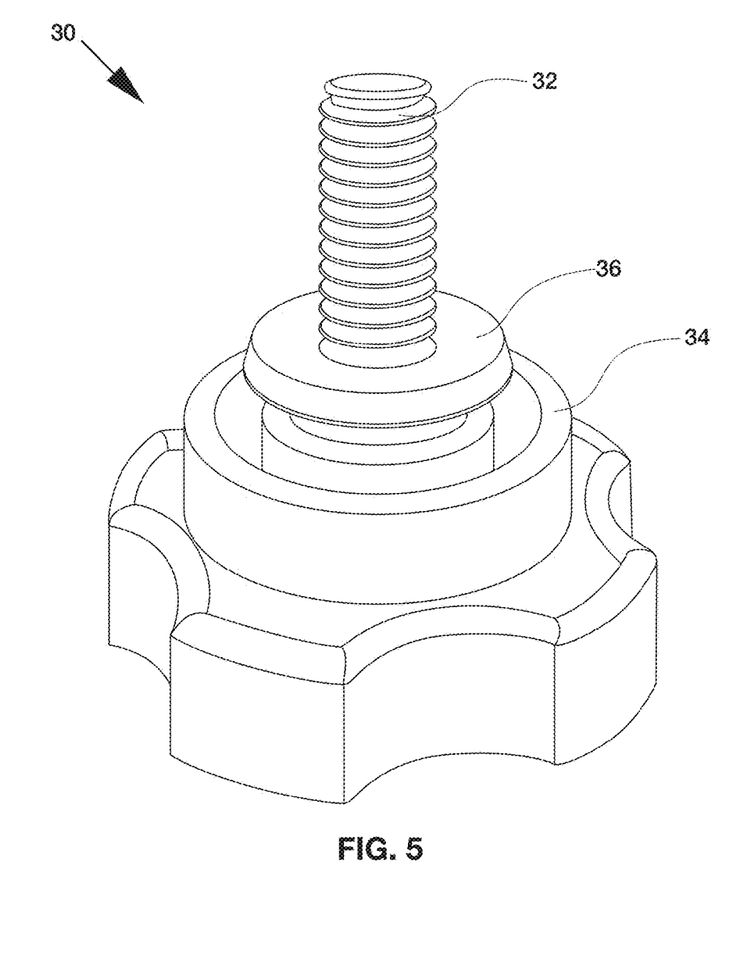
FIG. 5 is an enlarged perspective view of a fastener used to mount a canopy onto a universal mounting system.

FIG. 4 provides one example of a plate 22 suitable for adjustably mounting canopy 12. Plates 22' and 22" are on left and right ends of crossbar 24, and each include at least one slot 26 adapted to receive a fastener 30. One example of a suitable fastener is shown in FIG. 5. Fastener 30 includes a bolt 32 for insertion into the threaded holes 40 of canopy 12. Fastener 30 may include a knob 34 to assist with tightening and loosening, and may also include a rubber washer 36 to achieve friction between plate 22 and the head of bolt 32.

Canopy 12 can be fastened to mounting system 10 by aligning holes 40 on canopy 12 with slots 26 and passing fasteners 30 through the aligned slots and holes. The canopy is provided with nuts or other threaded types of connectors at holes 40 (such as 40a, 40b, 40c) to receive the bolt fastener 30. The attitude of canopy 12 can be adjusted to a desired orientation by positioning fasteners 30 at a selected position in slots 26. In some embodiments, plate 22 includes two opposing slots 26' and 26". Having a plurality of slots on a single plate facilitates adjustment of canopy 12 by allowing its angle to be fine-tuned. Slots 26' and 26" may be curved, as seen in FIG. 4, to provide additional ease for angling canopy 12.

Figure 6:
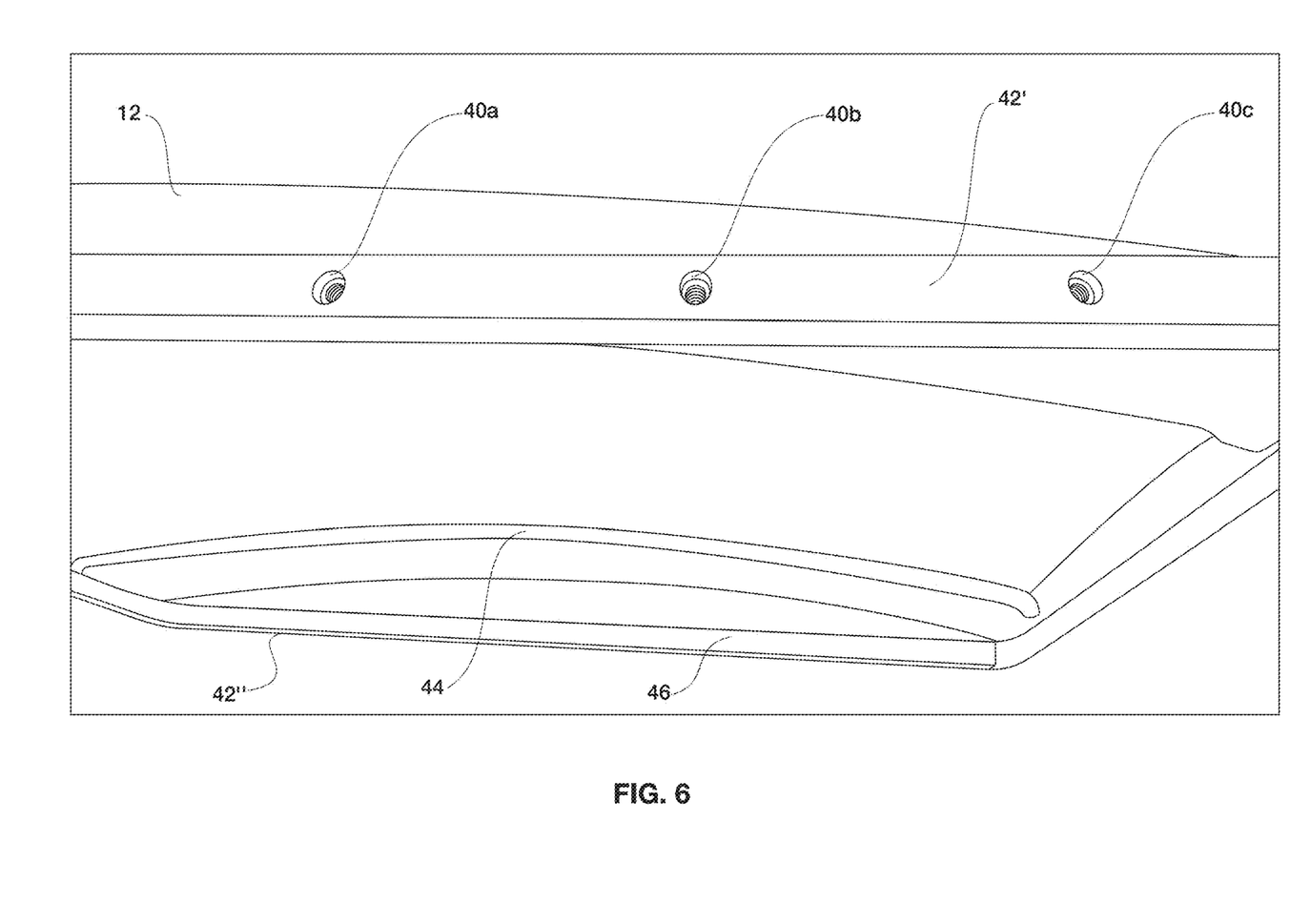
FIG. 6 is an enlarged perspective side view of a canopy adapted for use with a universal mounting system.

Canopy 12 includes a hole 40 on each of its left and right peripheral sides 42', 42" for receiving fastener 30 and mounting onto plates 22' and 22". The embodiment shown in FIG. 6 depicts canopy 12 having a plurality of holes 40a, 40b, and 40c in a depending, surrounding flange. Providing multiple holes 40a, 40b, and 40c permits the canopy to be positioned at a selected forward or backward position in relation to the vehicle. Holes 40a, 40b, and 40c are spaced apart such that slots 26' and 26" can align with two of them and are threaded to mate with the threads of bolt 32. As shown, holes 40 are accessible from the exterior side of canopy 12. However, in other embodiments, holes 40 may be alternatively installed on the interior side of canopy 12. Canopy 12 may also include cross-braces 44 and steel beams 46 for additional structural reinforcement and deformation prevention.

Figure 7:
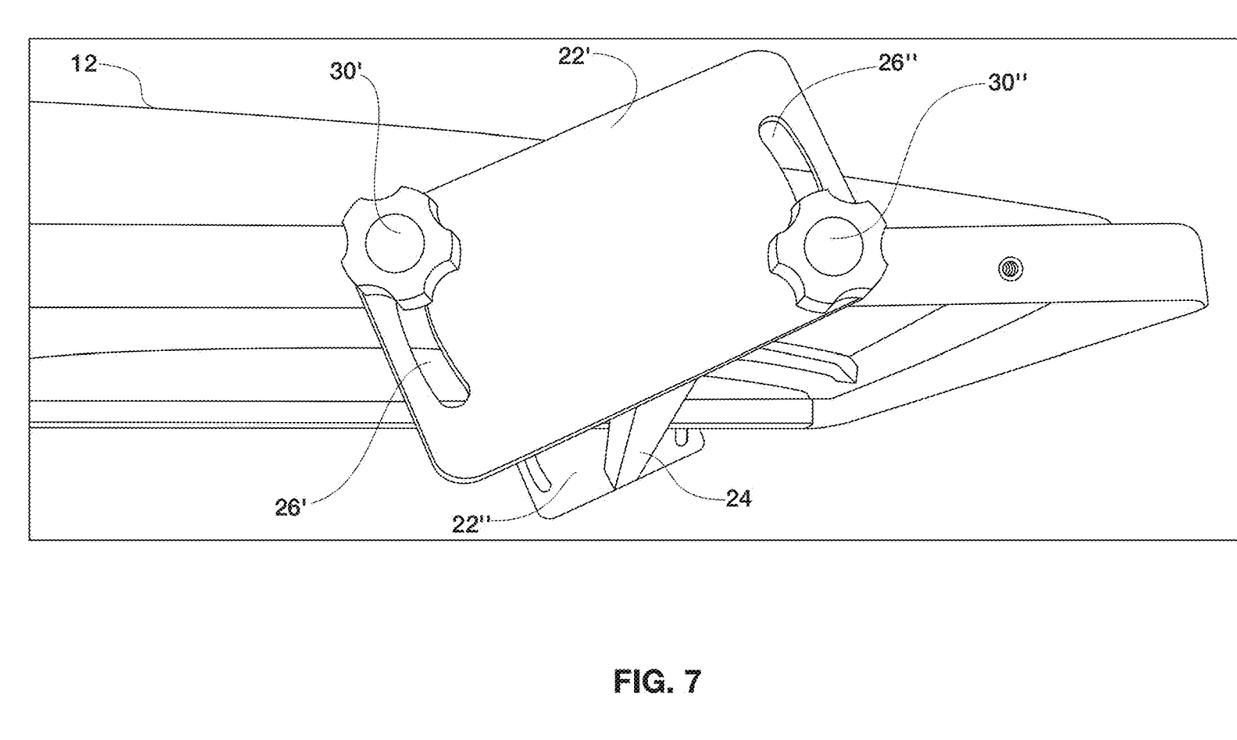
FIG. 7 is an enlarged side perspective view of a canopy mounted onto a universal mounting system.

FIG. 7 illustrates an example of how canopy 12 may be mounted and adjusted. Canopy 12 is oriented above cross bar 24, with slots 26 aligned with holes 40 of canopy 12. Fasteners 30 are inserted through slots 26 and into holes 40. The rubber washer 36 provides a resilient grip on the plates 22. Canopy 12 may be angled in a desired position before completely tightening fasteners 30. In another embodiment, the holes 40 may be found on the inside flange of canopy 12 (not shown in the drawings), and the plate 22 and slots 26 can mount to the inside of the canopy through holes 40. In this embodiment, the shape of the canopy is adjusted to allow for movement of the canopy within the slots without hitting the undersurface of the canopy.

In operation, the present invention may also be considered a method for installing a canopy onto any tractor or mower ROPS, wherein the ROPS comprises roll bars having left and right downward extensions and a bridging element between the left and right downward extensions. For instance, a user may first clamp a mount having a crossbar with plates at opposing ends onto the bridging element. The clamp size may be selected according to the size of the bridging element to secure the mount. Once the mount is secured onto the ROPS, the canopy is placed on top of the mount. Holes along the periphery of the canopy are then aligned with a slot along each plate. The canopy is then initially secured to the plates by passing bolts through the holes and slots. The angle of the canopy is then adjusted by positioning the bolts along the slots, and then the canopy is secured at that angle by tightening the bolts onto the plates.

Certain modifications and improvements will occur to those skilled in the art upon reading the foregoing description. By way of example, the crossbar may comprise separate components that are mounted onto the left and right downward extensions separately as opposed to a single piece mounted onto the bridging element of a ROPS. Also, the canopy may be rotationally molded from plastics, such as polyethylene. It should be understood that all such modifications and improvements have been omitted for the sake of conciseness and readability, but are properly within the scope of the following claims.

What is claimed is:

1. A universal canopy for tractor and mower roll over protection systems (ROPS) that have left and right downward extensions and a bridging element between the left and right downward extensions comprising:

a ROPS mount including a clamp to clamp to a ROPS, a crossbar attached to the clamp to extend laterally across the ROPS to the left and right downward ROPS extensions, and plates on each opposed end of the crossbar, the plates having two opposed arcuate cutouts, and a canopy with left and right depending peripheral flanges that have a plurality of holes arrayed in a fore-and-aft orientation, whereby the ROPS mount can be clamped to a ROPS and the canopy can be bolted to the ROPS mount by passing bolts through selected ones of the holes in the flanges and one of the arcuate cutouts, and the canopy attitude can be adjusted to a desired orientation by positioning bolts at a selected position in the arcuate cutouts.

2. The canopy as claimed in claim 1, wherein the canopy is formed of thermoformed plastic.

3. The canopy as claimed in claim 2, wherein the canopy is thermoformed from acrylonitrile butadiene styrene.

4. The canopy as claimed in claim 1 further including a coextruded acrylic layer coated on the canopy.

5. The canopy as claimed in claim 4, wherein the acrylic layer is an acrylic film.

6. The canopy as claimed in claim 1, wherein the clamp includes a ROPS clamp element with a channel to mate with a ROPS and flanges and a crossbar clamp element with a channel to mate with the crossbar, and both the ROPS clamp element and crossbar clamp element have flanges that can be positioned facing one another and held together to clamp the crossbar to the ROPS.

7. The canopy as claimed in claim 1, wherein the holes are located on an exterior face of the canopy.

8. A universal mount for installing a canopy onto tractor and mower roll over protection systems (ROPS) that have left and right downward extensions and a bridging element between the left and right downward extensions comprising:

a clamp to secure the universal mount onto a ROPS, a crossbar attached to the clamp extending parallel to the bridging element, and plates on each opposed end of the crossbar, each plate having two cutouts adapted to receive a fastener, wherein the universal mount can be clamped to a ROPS and the canopy can be fastened to the universal mount by aligning holes on the canopy with the cutouts and passing fasteners through, and the canopy attitude can be adjusted to a desired orientation by positioning fasteners at a selected position in the cutouts.

9. The universal mount as claimed in claim 8, wherein the cutouts for each plate comprise two opposing slots.

10. The universal mount as claimed in claim 8, wherein the cutouts are curved.

11. The universal mount as claimed in claim 8, wherein the clamp attaches to the bridging element of the ROPS.

12. A method for installing a canopy onto tractor and mower roll over protection systems (ROPS) that have left and right downward extensions and a bridging element between the left and right downward extensions comprising the steps of:

clamping a mount having a crossbar with plates at opposing ends to the bridging element, aligning holes along the periphery of the canopy with a slot along each plate, passing bolts through the holes and slots, adjusting the angle of the canopy by positioning the bolts along the slots, and securing the canopy at the angle by fastening the bolts onto the plates.

13. A kit for installing a canopy onto a tractor and mower roll over protection systems (ROPS) comprising:

a crossbar adapted to extend parallel to a bridging element of a ROPS;

a clamp having
 a ROPS clamp element with a channel to mate with the ROPS,
 a pair of flanges, and
 a crossbar clamp element with a channel to mate with the crossbar, wherein both the ROPS clamp element and crossbar clamp element having flanges that can be positioned facing one another and held together to clamp the crossbar to the ROPS;

plates on each opposed end of the crossbar, each plate having two cutouts adapted to receive a fastener; and a canopy with left and right depending peripheral flanges that have a plurality of holes arrayed in a fore-and-aft orientation and spaced apart to align with the cutouts of each plate.

\* \* \* \* \*